US011982195B2

(12) United States Patent
Lourit et al.

(10) Patent No.: US 11,982,195 B2
(45) Date of Patent: May 14, 2024

(54) SEPARATION NOZZLE FOR AERONAUTIC TURBOMACHINE

(71) Applicant: SAFRAN AIRCRAFT ENGINES, Paris (FR)

(72) Inventors: Damien Daniel Sylvain Lourit, Moissy-Cramayel (FR); Adrien Jacques Philippe Fabre, Moissy-Cramayel (FR); Pierre Jean-Baptiste Metge, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 46 days.

(21) Appl. No.: 17/604,170

(22) PCT Filed: Apr. 14, 2020

(86) PCT No.: PCT/EP2020/060453
§ 371 (c)(1),
(2) Date: Oct. 15, 2021

(87) PCT Pub. No.: WO2020/212344
PCT Pub. Date: Oct. 22, 2020

(65) Prior Publication Data

US 2022/0205366 A1 Jun. 30, 2022

(30) Foreign Application Priority Data

Apr. 16, 2019 (FR) ....................................... 1904065

(51) Int. Cl.
*F01D 9/02* (2006.01)
*F01D 25/02* (2006.01)

(52) U.S. Cl.
CPC ............... *F01D 25/02* (2013.01); *F01D 9/02* (2013.01); *F05D 2220/323* (2013.01); *F05D 2230/31* (2013.01); *F05D 2240/128* (2013.01)

(58) Field of Classification Search
CPC ...... F01D 25/02; F01D 9/02; F05D 2220/323; F05D 2230/31; F05D 2240/128; F02C 7/04; F02C 7/047
See application file for complete search history.

(56) References Cited

U.S. PATENT DOCUMENTS 4,860,534 A * 8/1989 Easley .................... F02C 7/047 55/306
2012/0251373 A1* 10/2012 Bajusz .................... F01D 25/02 418/203

(Continued)

FOREIGN PATENT DOCUMENTS

EP 2481893 A2 8/2012
EP 2481893 A3 7/2016

(Continued)

OTHER PUBLICATIONS

French Preliminary Search Report with a Written Opinion on Patentability dated Dec. 6, 2019 in FR1904065.

(Continued)

*Primary Examiner* — Steven M Sutherland
(74) *Attorney, Agent, or Firm* — Sughrue Mion, PLLC

(57) ABSTRACT

A splitter between a primary flow and a secondary flow of a dual flow turbomachine includes a single-piece structure including an outer annular wall, an inner annular wall, a radial annular wall and an inner annular baffle, defining a first cavity between the outer annular wall and the inner annular baffle, and a second cavity between the inner annular wall, the radial annular wall and the inner annular baffle.

9 Claims, 4 Drawing Sheets

(56) References Cited

U.S. PATENT DOCUMENTS

| | | | | |
|---|---|---|---|---|
| 2017/0321604 | A1* | 11/2017 | Lourit | F02C 7/047 |
| 2018/0291808 | A1* | 10/2018 | Parry | F01D 25/24 |

FOREIGN PATENT DOCUMENTS

| | | | |
|---|---|---|---|
| EP | 3156615 | A1 | 4/2017 |
| EP | 3312391 | A1 | 4/2018 |
| FR | 3051016 | A1 | 11/2017 |

OTHER PUBLICATIONS

International Search Report dated Jun. 3, 2020 in Application No. PCT/EP2020/060453.

Written Opinion of the International Searching Authority dated Jun. 3, 2020 in Application No. PCT/EP2020/060453.

* cited by examiner

SEPARATION NOZZLE FOR AERONAUTIC TURBOMACHINE

FIELD OF THE INVENTION AND PRIOR ART

The present invention relates to the field of turbomachines and more particularly to a deicing system for a splitter of an aeronautical turbomachine.

In an aeronautical turbine of the two spool and dual flow type, the flow streams of the primary flow and of the secondary flow area separated downstream of the fan by a splitter. Within the primary stream, at the inlet of the low-pressure compressor (also commonly called a "booster"), are located a set of fixed inlet guide vanes (also called IGV). In certain phases of flight and on the ground, icing atmospheric conditions can be encountered by the turbomachine, particularly when the ambient temperature is sufficiently low and in the presence of high humidity. Under these conditions, ice can be formed on the splitter and on the inlet guide vanes. When this phenomenon occurs, it can lead to the partial or total obstruction of the primary stream, and to the ingestion of detached blocks of ice into the primary stream. An obstruction of the primary stream causes insufficient feeding of the combustion chamber which can then be extinguished out or prevent the acceleration of the engine. In the event of the detachment of blocks of ice, the latter can damage the compressor located downstream and also lead to the extinction of the combustion chamber. To avoid the formation of ice on the splitter, techniques are known consisting of extracting hot air in the primary stream at a compressor and injecting it inside the splitter. The hot air injected into the splitter can then be routed inside the nozzle to bores or grooves configured to inject the hot air into the primary stream, which can also deice the inlet guide vanes. The necessary flow rate of hot air for deicing the splitter is high. This extraction of hot air can reduce the performance and operability of the turbomachine.

It has seemed desirable to be able to increase the effectiveness of the deicing of the nozzle.

One known solution consists of reducing the volume inside the nozzle, and thus reduce the heat losses inside the nozzle. It is thus known to add an annular baffle in the cavity of the nozzle. The baffle allows reducing the volume of the cavity of the nozzle and orienting the hot air toward the zones of interest for deicing. However, the addition of a baffle (and of its different attachment elements) makes the nozzle heavier, which is manifested by an increase of the fuel consumption of the turbine during operation. It would therefore be desirable to be able to increase the effectiveness of the deicing of the splitter without however increasing the extraction of hot air in a pressurized portion of the turbomachine, without increasing the mass of the nozzle.

GENERAL PRESENTATION OF THE INVENTION

According to a first aspect, the invention relates to a splitter between a primary flow and a secondary flow of a dual flow turbomachine. The nozzle has a single-piece structure and comprises an outer annular wall, an inner annular wall, a radial annular wall and an inner annular baffle, defining a first cavity between the outer annular wall and the inner annular baffle, and a second cavity between the inner annular wall, the radial annular wall and the inner annular baffle.

In a particularly advantageous manner, the deflector allows reducing the inner volume of the nozzle in which the hot air circulates. This arrangement therefore allows reducing the heat losses and thus reducing the extraction of hot air. In addition, the baffle allows guiding the hot air within the nozzle.

Moreover, the single-piece structure allows dispensing with numerous connecting parts and therefore reducing the mass of the nozzle compared to known devices. In addition, the mechanically consistent assembly which the single-piece structure constitutes can allow refining the assembly of the walls of the nozzle and further reducing its mass.

Thus, the invention allows increasing the effectiveness of the deicing of the splitter without however increasing the extraction of hot air in the pressurized portion of the turbomachine, without increasing the mass of the nozzle.

The outer annular wall can have at a junction region with the inner annular wall a series of radial holes.

The nozzle can have at least one axial rib between the inner annular wall and the inner annular baffle.

According to one particular arrangement, the nozzle can have a plurality of axial ribs, each coplanar with an axis of revolution of the nozzle.

The beak can have at least one radial rib between the radial annular wall and the inner annular baffle.

According to one particular arrangement, the nozzle can have a plurality of radial ribs, each coplanar with an axis of revolution of the nozzle.

The nozzle can have at least one air cell formed at least partially in the radial annular wall.

The radial annular wall can have a bore leading into the at least one air cell. The radial annular wall can have at least one oblong opening adapted to accommodate an injector leading into the second cavity.

According to a second aspect, the invention relates to a straightener for an aeronautical turbomachine, which has a single-piece structure formed by additive manufacture, comprising a nozzle having: (i) the single-piece structure comprising an outer annular wall, an inner annular wall, a radial annular wall and an inner annular baffle, (ii) the first cavity between the outer annular wall and the inner annular baffle, (iii) the second cavity between the inner annular wall, the radial annular wall and the inner annular baffle.

According to a third aspect, the invention relates to a method for manufacturing a straightener of an aeronautical turbomachine having a single-piece structure formed by additive manufacturing and comprising a nozzle having: (i) a single-piece structure comprising an outer annular wall, an inner annular wall, a radial annular wall and an inner annular baffle, (ii) a first cavity between the outer annular wall and the inner annular baffle, (iii) a second cavity between the inner annular wall, the radial annular wall and the inner annular baffle.

The method can comprise a step of manufacturing the nozzle beginning with the radial annular wall.

DESCRIPTION OF THE FIGURES

Other features and advantages will still be revealed by the description that follows, which is purely illustrative and not limiting, and must be read with reference to the appended figures in which.

DETAILED DESCRIPTION OF THE INVENTION

General Architecture

Figure 1:
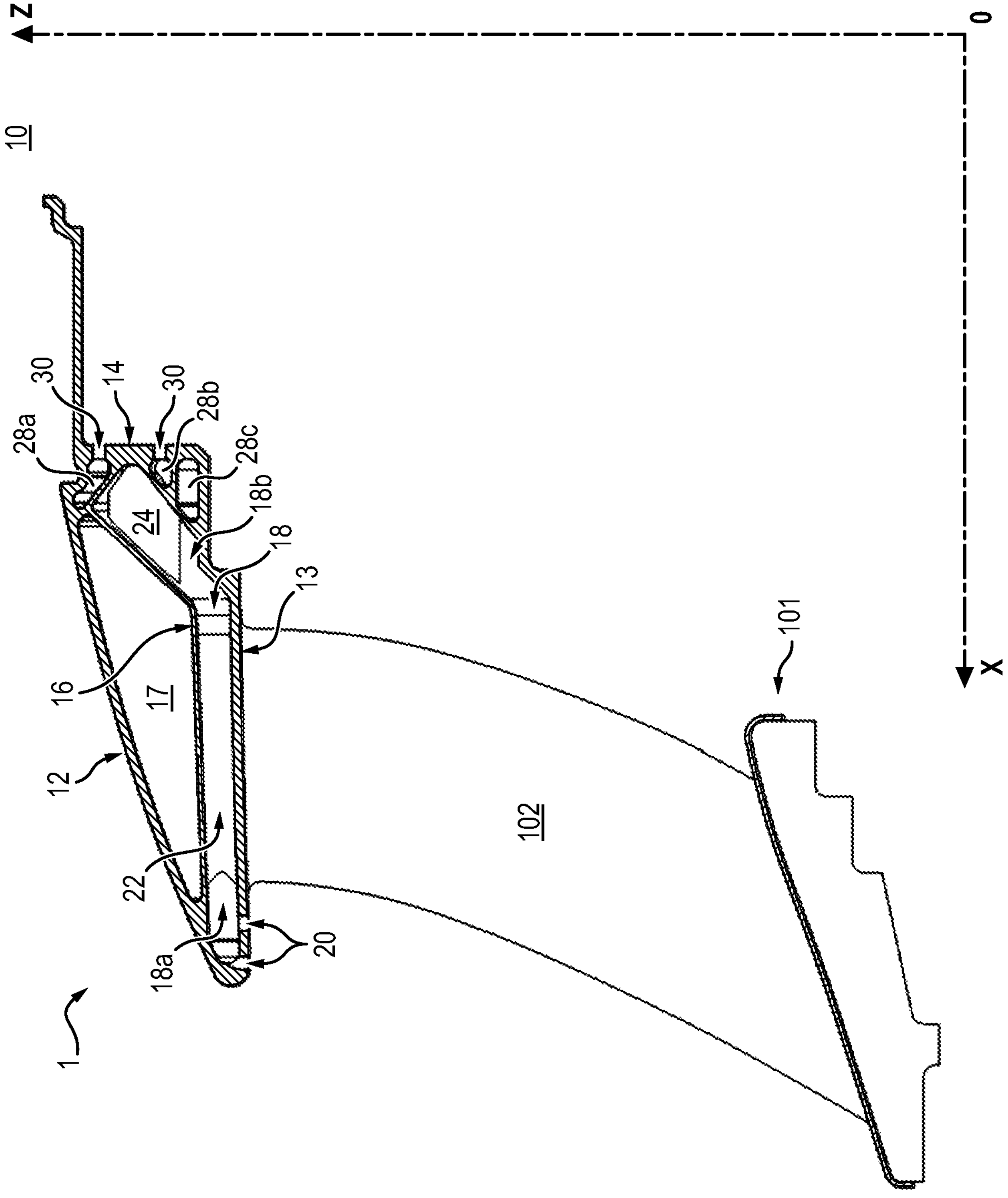
FIG. 1 is a partial section view of a nozzle and of a straightener vane.

With reference to FIGS. 1 to 4, according to a first aspect, the invention relates to a splitter 1 of a dual flow aeronautical turbomachine. The splitter 1 separates, as explained, the primary flow from the secondary flow. It is intended to be positioned downstream of a fan (shown partially in section in FIG. 1) of the turbomachine to form a separation between the annular flow channels (i.e. the streams) of the primary flow and of the secondary flow originating in the fan.

According to the embodiment presented here, the splitter 1 is an integral part of a straightener 10 of the primary flow. The splitter 1 and the straightener 10 are axially symmetrical parts. It is thus understood that the splitter 1 forms a substantially cylindrical element inside which passes the primary flow, and outside (around) which passes the secondary flow. For the continuation of the description, an axis of revolution X of the straightener 10 (and of the splitter 1) is defined, and a radial axis Z, substantially perpendicular to the axis of revolution X, shown in FIGS. 1 and 2. According to a radial direction Z progressing from the interior (closest to the axis of revolution X) toward the exterior (farthest from the axis of revolution X), the straightener comprises successively: an inner ferrule 101, vanes 102 and the splitter 1.

Splitter

Figure 2:
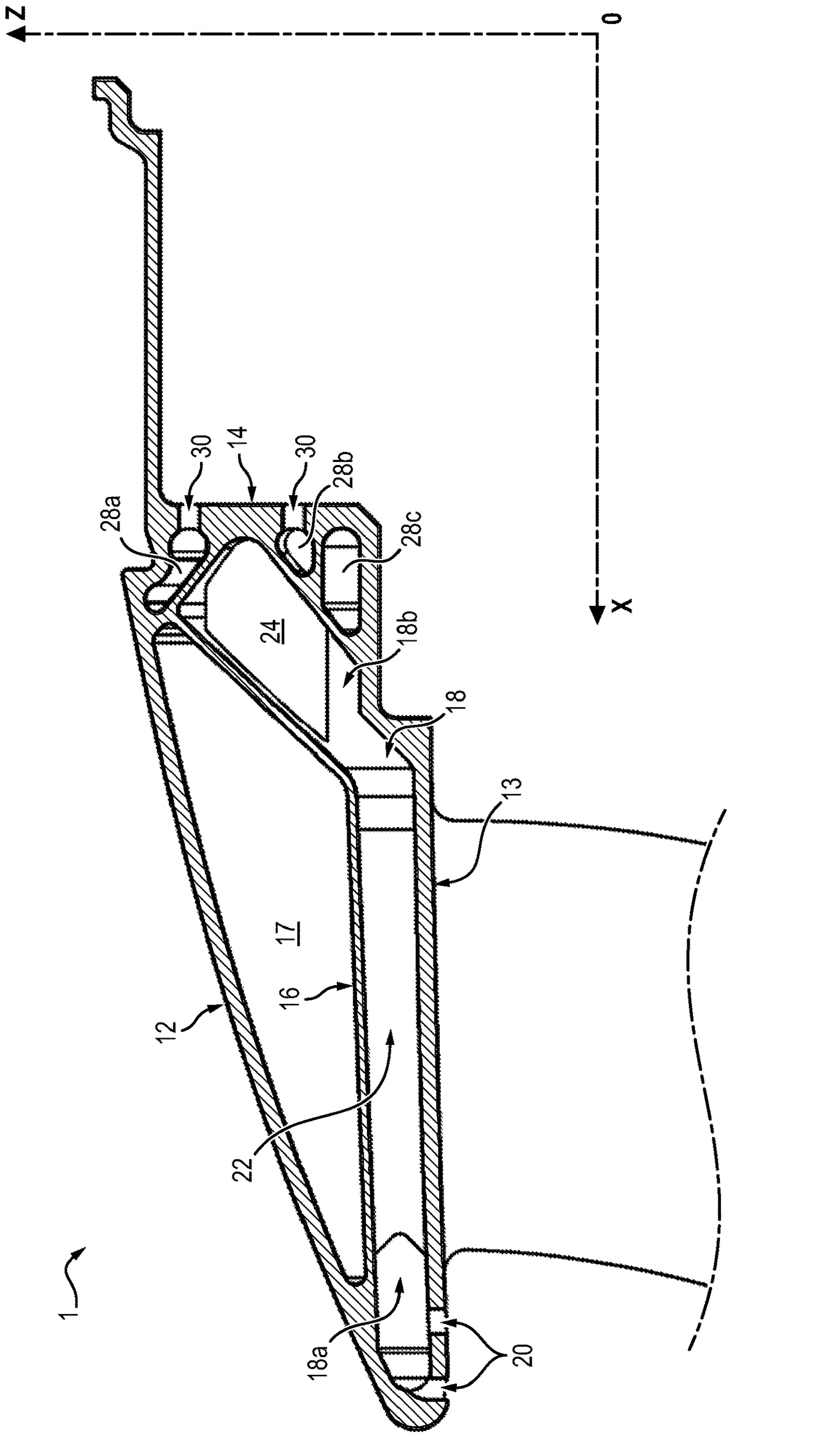
FIG. 2 is a section view of a nozzle according to the invention.

In a particularly advantageous manner, the splitter 1 also has a single-piece structure. As described hereafter, the splitter 1 is preferably formed by additive manufacturing. The splitter 1 comprises an outer annular wall 12, an inner annular wall 13, a radial annular wall 14 and an inner annular baffle 16. When passing through the splitter 1 in said radial direction Z, the inner wall 13, the inner annular baffle 16 and the outer annular wall 12 are encountered in succession. A section of the splitter 1 in a plane XoZ (as can be seen in FIGS. 1 and 2) has substantially the shape of a right triangle, the legs of which are the outer annular wall 12, the inner annular wall 13 and the radial annular wall 14, and its outer annular wall 12 is the hypotenuse.

The inner annular wall 13 and the outer annular wall 12 join moving upstream (i.e. toward the fan) to form the "splitter" in functional terms. A junction region of the outer annular wall 12 and the inner annular wall 13 is defined.

The outer annular wall 12 is preferably slightly curvilinear, particularly domed (convex), so as to improve the overall aerodynamics of the splitter 1.

Between the outer annular wall 12 and the inner annular deflector 16, the splitter 1 has a first cavity 17.

Between the inner annular wall 13, the radial annular wall 14 and the inner annular baffle 16, the splitter 1 has a second cavity 18.

In other words, the splitter 1 is substantially divided into two by the annular inner baffle 16, this defining the two cavities 17, 18. It is understood in fact that the splitter 1 is substantially hollow (with the exception of a zone in proximity to the radial annular wall 14, see below).

To this end, the inner annular deflector 16 extends from the junction region of the outer annular wall 12 and of the inner annular wall 13 to a junction region of the outer annular wall 12 and the radial annular wall 14. It preferably has an angled shape so that the first cavity 17 occupies the major portion of the volume of the splitter 1, the second cavity 18 following essentially the radial annular wall 14, then the inner annular wall 13. The second cavity has a first portion 18*a* between the inner annular wall 13 and the inner annular baffle 16, and a second portion 18*b* between the radial annular wall 14 and the inner annular baffle 16. It is specified that the two portions 18*a* and 18*b* of the second cavity 18 communicated with one another and define a single volume.

Figure 3:
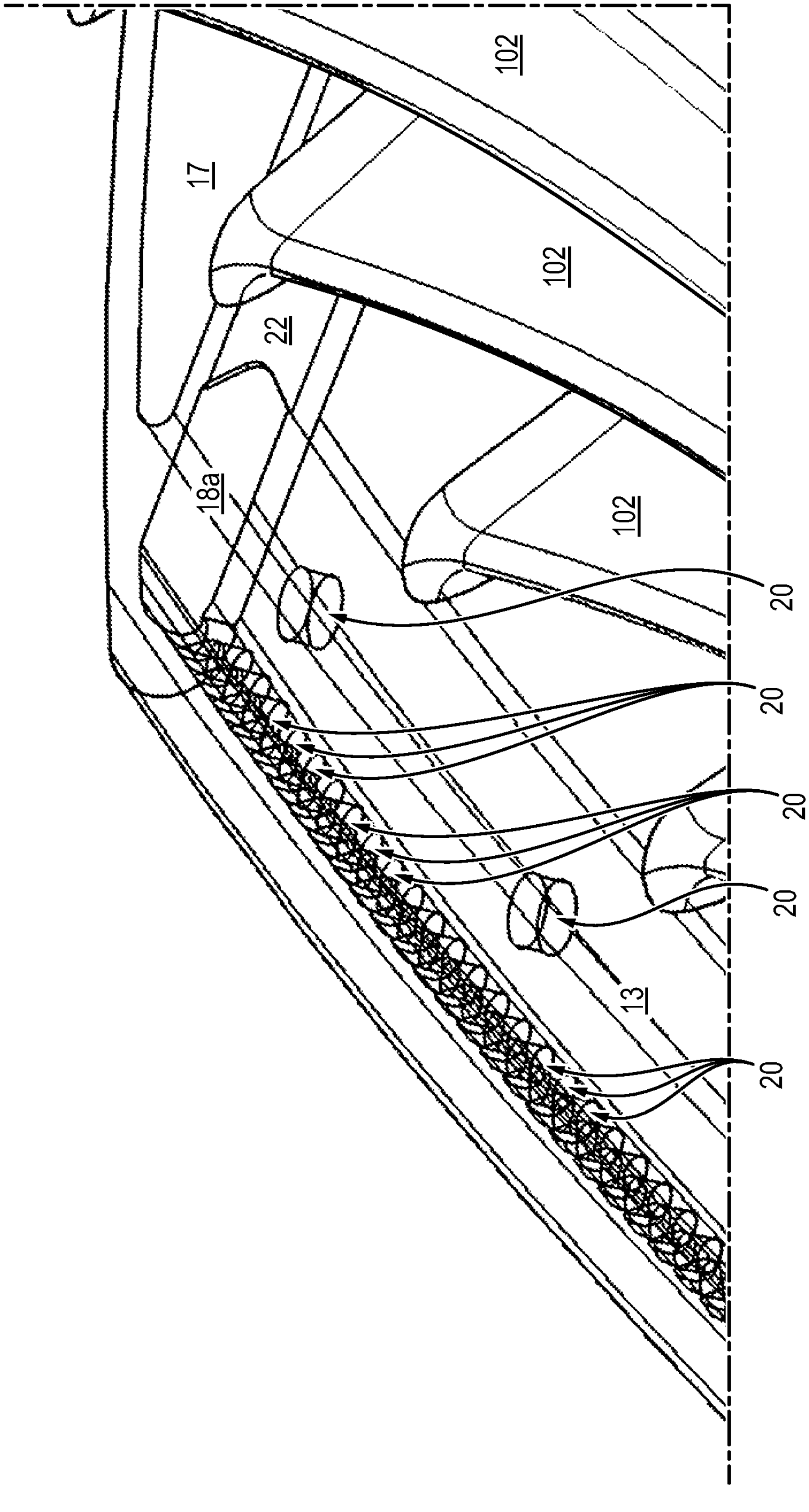
FIG. 3 is a partial perspective view of a nozzle and of a straightener vane.

With reference in particular to FIGS. 2 and 3, the inner annular wall 13 has at the junction region of the outer annular wall 12 and the inner annular wall 13 a series of holes 20, radial in particular (i.e. leading in the direction of the longitudinal axis). As will be described hereafter, the radial holes 20 allow optimal evacuation of the hot air blown into the second cavity 18 at its end, in particular to reheat the air entering at the vanes 102 in the primary stream, so as to deice the splitter 1 and the vanes 102.

In addition, preferably, the splitter 1 comprises a series of axial ribs 22 between the inner annular wall 13 and the inner annular baffle 16, extending in the first portion 18*a* of the second cavity 18. It is specified that each of the axial ribs 22 is coplanar with the axis of revolution X, i.e. in the plane XoZ.

Likewise, the splitter 1 comprises a series of radial ribs 24 extending between the radial annular wall 14 and the inner annular baffle 16, extending in the second portion 18*b* of the second cavity 18. It is specified that each of the radial ribs 24 is coplanar with the axis of revolution X, i.e. again in the plane XoZ.

What is meant here by "axial" and "radial" is simply their main extension direction. Moreover, each axial rib 22 can be coplanar with a radial rib 24. It is understood that the axial and radial ribs 22, 24 define azimuthal partitioning (i.e. sectors) of the second cavity 18, but incomplete ones (i.e. the ribs 22 and 24 nevertheless remains spaced and advantageously do not touch one another), so that at a junction region of the inner annular wall 13 and the radial annular wall 14 (i.e. at the junction of the first and second portions of the second cavity . . . ) the second cavity 18 is not ribbed, allowing an azimuthal communication. Similarly, the axial ribs 22 do not extend until the end of the second cavity, so as to also allow azimuthal communication at the level of the holes 20. In a particularly advantageous manner, the axial 22 and radial 24 ribs have a dual function of mechanical reinforcement and guiding the flow of hot air.

In fact, the axial 22 and radial 24 ribs allow stiffening the splitter 1, which allows avoiding a possible collapse of the splitter 1. The axial 22 and radial 24 ribs advantageously allow optimizing the mass of the splitter 1 by allowing refining the thickness of the inner annular baffle 16, of the radial annular wall 14 and of the inner annular wall 13. It is understood that this mass optimization relies on a compromised between the addition of mass of the ribs and the reduction of thickness of the walls and of the baffle that they allow. Moreover, during the manufacture of the splitter 1, according to an additive manufacturing method, the axis 22 and radial 24 ribs allow guaranteeing the good mechanical strength of the splitter 1 during manufacture, As will be detailed, in operation, the axial 22 and radial 24 ribs allow guiding the flows of hot air to deice the splitter 1.

Moreover, as can be observed in particular in FIG. 2, the splitter 1 advantageously has a plurality of air cells 28*a*, 28*b*, 28*c*. According to the embodiment shown here, the splitter 1 comprises three air cells 28*a*, 28*b* and 28*c*. A first air cell 28*a* can be located in a corner region of the outer annular wall 12 and the radial annular wall 14. It is worth noting that according to the embodiment presented here, the first air cell 28*a* has a kidney-shaped cross section in the plane XoZ (i.e. has a cross-section substantially in the shape of a string bean in the plane XoZ). A second and a third air cells 28*b* and 28*c* are located in a corner region of the inner annular wall 13 and of the radial annular wall 14. These air cells 28*a*, 28*b*, 28*c* correspond to material lightening regions. In other words, within the scope of production using additive manufacturing, the air cells 28*a*, 28*b*, 28*c* correspond to zones in which no material is deposited because it would not represent added value in terms of mechanical resistance (though it would necessarily add to the mass).

Thus, it is remarkable that the formation of the splitter 1 by additive manufacturing allows obtaining a single-piece structure, but also allows optimizing the geometry of the splitter 1 to have a better ratio between mass and resistance. In this particular case, the air cells 28*a*, 28*b*, 28*c* would be very difficult to form other than by using additive manufacturing.

The radial annular wall 14 can have bores 30 leading into the first and second air cells 28*a* and 28*b*. The bores 30 advantageously allow evacuating a portion of the powder resulting from the additive manufacturing of the splitter 1.

Figure 4:
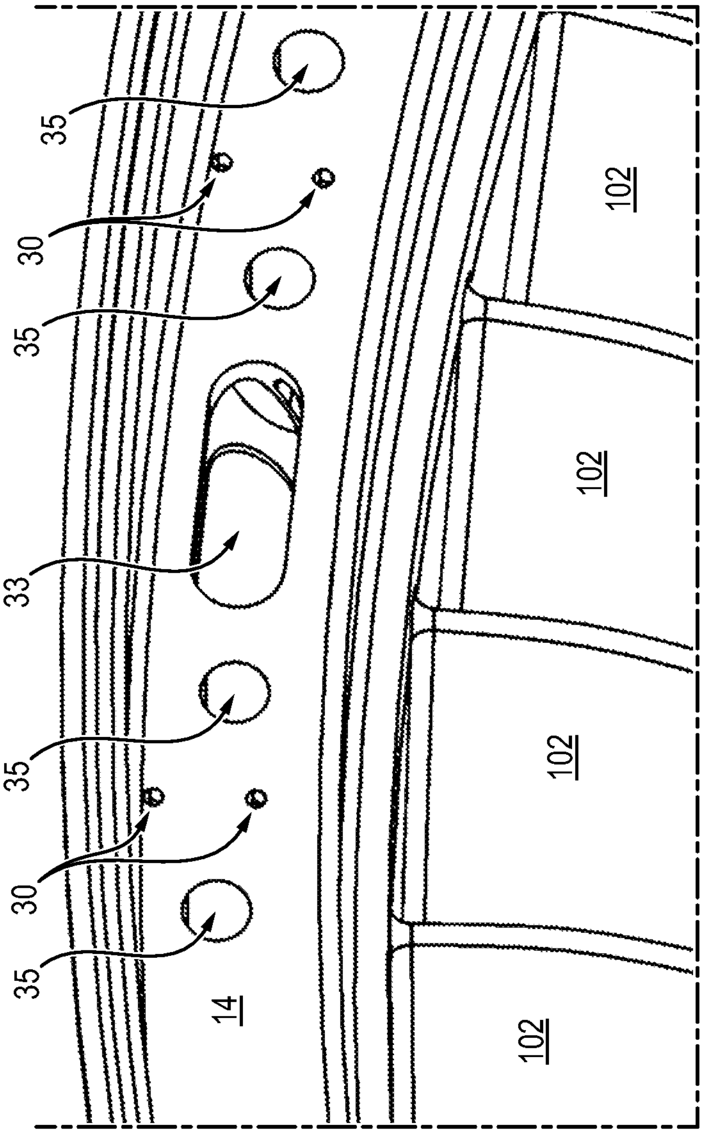
FIG. 4 is a partial perspective view of a radial annular wall.

As shown in FIG. 4, the radial annular wall 14 can have oblong openings 33 each adapted to accommodate an injector leading into the second cavity 28 to blow hot air into it.

Moreover, the radial wall 14 can have a plurality of attachment bores 35.

Manufacturing Method

In a particularly advantageous manner, the straightener 10 is manufactured by means of an additive manufacturing method.

Thus, the straightener 10 is manufactured by successive additions of melted powder, layer by layer. As previously disclosed, this manufacturing method allows obtaining a single-piece part having a specific geometry.

Preferably, the straightener 10 is manufactured beginning with the radial annular wall 14 of the splitter, in a progression direction (i.e. of addition of layers of material) substantially parallel to the axis of revolution X.

Operation

An injector (not shown) can be connected to each oblong opening 33. The injectors can blow hot air into the second cavity 18.

In a particularly advantageous manner, the inner annular deflector 16 allows reducing the inner volume of the splitter 1 by dividing it into two cavities. Thus, the volume in which the hot air circulates is reduced, which reduces heat loss in the splitter 1 and allow reducing the extraction of hot air. In addition, the inner annular baffle 16 allows orienting the hot air toward the zones of interest for deicing.

The heat radiation of the hot air inside the splitter 1 allows deicing the splitter 1. The hot air circulating in the second cavity 18 is then distributed by the radial holes 20 to join the primary stream and deice the vanes 102.

Thus, the invention allows effectively deicing the splitter without however increasing the extraction of hot air in a pressurized portion of the turbomachine and without increasing the mass of the splitter.

The invention claimed is:

1. A splitter between a primary flow and a secondary flow of a dual flow turbomachine, wherein the splitter has a single-piece structure comprising an outer annular wall, an inner annular wall, a radial annular wall and an inner annular baffle, defining a first cavity between the outer annular wall and the inner annular baffle, and a second cavity between the inner annular wall, the radial annular wall and the inner annular baffle, wherein the splitter has at least one air cell formed at least partially in the radial annular wall.

2. The splitter according to claim 1, wherein the outer annular wall has a series of radial holes at a junction region with the inner annular wall.

3. The splitter according to claim 1, having at least one axial rib between the inner annular wall and the inner annular baffle.

4. The splitter according to claim 3, having a plurality of axial ribs each coplanar with an axis of revolution of the splitter.

5. The splitter according to claim 1, having at least one radial rib between the radial annular wall and the inner annular baffle.

6. The splitter according to claim 5, having a plurality of radial ribs each coplanar with an axis of revolution of the splitter.

7. The splitter according to claim 1, wherein the radial annular wall has a bore leading into the at least one air cell.

8. The splitter according to claim 1, wherein the radial annular wall has at least one oblong opening adapted to accommodate an injector leading into the second cavity.

9. A straightener for an aeronautical turbomachine having a single-piece structure comprising an inner ferrule, inlet guide vanes, and a splitter, wherein the splitter comprises:

a single-piece structure comprising an outer annular wall, an inner annular wall, a radial annular wall, and an inner annular baffle, a first cavity between the outer annular wall and the inner annular baffle, and a second cavity between the inner annular wall, the radial annular wall and the inner annular baffle, wherein the splitter has at least one air cell formed at least partially in the radial annular wall.

* * * * *